US 6,669,338 B2

(12) United States Patent
Wertheim et al.

(10) Patent No.: US 6,669,338 B2
(45) Date of Patent: Dec. 30, 2003

(54) METHOD OF USING A TABLET FOR INTRODUCING TINT, UV ABSORBERS AND OTHER CHEMICALS INTO SPECTACLE LENS AND OPTICAL FILTER TINTING SYSTEMS

(75) Inventors: Herbert A. Wertheim, Miami, FL (US); William F. Moore, Miami, FL (US)

(73) Assignee: Brain Power Incorporated, Miami, FL (US)

( * ) Notice: Subject to any disclaimer, the term of this patent is extended or adjusted under 35 U.S.C. 154(b) by 0 days.

(21) Appl. No.: 10/046,044

(22) Filed: Jan. 15, 2002

(65) Prior Publication Data

US 2002/0060775 A1 May 23, 2002

Related U.S. Application Data

(63) Continuation-in-part of application No. 09/499,660, filed on Feb. 8, 2000, now abandoned.

(51) Int. Cl.$^7$ ................ G02C 7/10; D06P 5/00
(52) U.S. Cl. ............ 351/177; 351/163; 8/506
(58) Field of Search .............. 351/162, 163–165, 351/177; 8/507, 506

(56) References Cited

U.S. PATENT DOCUMENTS 5,743,920 A * 4/1998 Kohan ................ 8/506

* cited by examiner

*Primary Examiner*—Scott J. Sugaman

(57) ABSTRACT

The method of using a tablet or coated tablet to introduce tint concentrate, UV absorbers, decolorant, conditioner and other optical chemistry into the dyebaths used for tinting plastic ophthalmic non-contact spectacle lenses and optical filters.

7 Claims, 1 Drawing Sheet

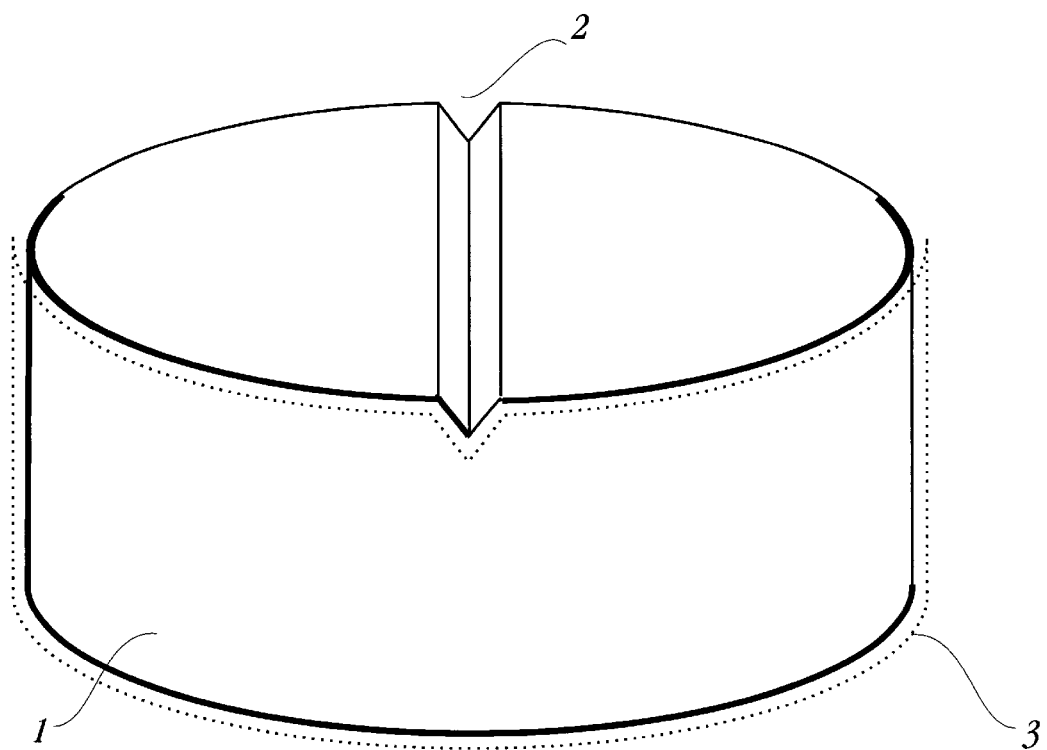

METHOD OF USING A TABLET FOR INTRODUCING TINT, UV ABSORBERS AND OTHER CHEMICALS INTO SPECTACLE LENS AND OPTICAL FILTER TINTING SYSTEMS

This application is a C-I-P of prior application Ser. No. 09/499,660 filed Feb. 8, 2000, now abandoned.

BACKGROUND

1. Field of the Invention

The invention relates to the method of using tablets by professionals and laboratory technicians within the optical and ophthalmic industry to introduce tints, UV absorbers, conditioners and other chemicals into heated and non-heated dyebaths in order to color, impart a UV blocking characteristic, decolor and provide other chemical treatments to plastic optical non-contact spectacle lenses and optical filter materials.

2. Description of Related Art

Within the optical lens and optical filter manufacturing industry, it has been a widespread practice to color, UV protect, hard coat, decolor, condition, clean and otherwise chemically treat plastic non-contact spectacle lenses and filters after manufacture in accordance with the customer's cosmetic preference. Numerous techniques have been used to introduce tints, UV absorbers, decolorants, conditioners and other chemicals into the dyebaths used for tinting and otherwise treating non-contact spectacle lenses and filters. The most common technique is to use a concentrated liquid solution, although tint, UV absorber, decolorant and other chemical powders and capsules of such powders have also been employed. All of these techniques have the drawback of poor control over the concentrate. Concentrated liquids and powders can be spilled easily. The capsules or other packages can be torn, spilling out their contents, which can then become airborne. The quantities being introduced into the dyebath are often not precisely known. An examination of the various manufacturers of tints, UV absorbers, decolorants and other chemicals for ophthalmic lenses and filters shows many producers of liquid concentrate tints, UV absorbers, decolorants and other chemicals such as Brain Power Incorporated, Action, et. al. Most of these companies also produce the same materials in powder form, often encapsulated in a capsule or dissolvable plastic pack. The use of tablets or coated tablets to introduce ophthalmic tint, UV absorber, decolorant, conditioner or other chemical concentrate into plastic non-contact spectacle lens and optical filter tinting dyebaths, however has not been employed.

BRIEF SUMMARY OF THE INVENTION

The tablets are dropped into the dyebath where they dissolve, providing the desired solution. This tablet method is an improved technique for introducing tint, UV absorber, decolorant, conditioner, hardcoating or other chemical concentrate into dyebaths for the treatment of optical non-contact spectacle lenses and filters. The tablets occupy less volume than corresponding liquids or powders and are more easily stored and shipped.

The tablets are more rugged and thus safer from the standpoint of spillage. An additional coating may be applied to the surface of the tablet in order to provide even better containment of the material within the tablet. The coating on the tablet also reduces oxidation, hydration and other chemical changes of the chemicals in the tablet. There is less chance of the material becoming airborne than in the case of powders, so the use of tablets is cleaner and safer from both a fire and health standpoint. The tablets come in a predetermined size, so that measurement of the amount of tint, decolorant, UV absorber or other chemical to be used consists of simply counting the number of tablets or scored fractional pieces of tablet to be used. No weighing or liquid measure techniques are needed. Accordingly, several objects and advantages of the tablet method for introducing tint into dyebaths are:

(a) to provide an extremely compact means for supplying tint, UV absorber, decolorant, conditioner and other ophthalmic chemical concentrate for the ophthalmic and optical filter industry;

(b) to provide a means for better control of the tint, UV absorber, decolorant or ophthalmic chemical concentrate as it is handled;

(c) to provide more precise measurement of the quantity of tint, UV absorber, decolorant or ophthalmic chemical being introduced into the ophthalmic lens and filter tinting dyebath;

(d) to allow for the precise mixing of different colors using multiple tablets of different colors and weights and strengths;

(e) to increase shelf life of the tints and other chemicals which would otherwise be affected by oxidation, hydration and other chemical changes since tablets and coated tablets have low surface areas.

BRIEF DESCRIPTION OF THE DRAWING

FIG. 1 shows a perspective view of a typical tablet or coated tablet used in this method.

REFERENCE NUMERALS IN DRAWINGS

1. Typical tablet or coated tablet
2. Typical score mark to facilitate division
3. Typical coating

DETAILED DESCRIPTION OF THE INVENTION

The tablet to be employed in this method, 1., consists of powdered or granular tint, powdered or granular UV absorbers, powdered or granular decolorant or other powdered or granular ophthalmic chemical along with powdered or granular surfactants designed to produce the desired tinting color, UV absorption or other characteristic for non-contact spectacle lenses or optical filters. Binders may then be added in order to promote tabletization. These powders or granules are then compressed in a mold by the pressure needed to produce a strong, solid tablet. If the friability of the resultant tablet warrants, a coating, 3., may be applied to the tablet. This coating is one which will dissolve in heated water. The coating on the tablet eliminates or reduces the oxidation and hydration of the tints and other chemicals in the tablet and improves the tablet's shipping, storage and dissolving properties. An alternate means of tablet production would be to start with a solid version of the above chemicals and then generate the tablet from the solid material. All tablets may have score marks, 2., to facilitate division into fractional quantities. The tablet may be molded in various geometrical shapes. In use, the tablets are dropped into the dyebath wherein they dissolve, providing the tint solution, UV blocking solution, decolorant solution, hard coating solution, conditioning solution, cleaning solution or other chemical solution needed for treating plastic non-contact spectacle lenses and optical filters.

We claim:

1. The method of using tablets or coated tablets to introduce tint, UV absorbers, decolorant, conditioners and other optical chemistry into dyebaths for coloring and otherwise treating plastic non-contact spectacle lenses and optical filters, said method comprising the following steps of:
   a. providing a combination of powdered or granular tint, powdered or granular UV absorbers, powdered or granular decolorant along with powdered or granular surfactants all in the form of powders or granules and designed to produce the desired tinting color, UV absorption or other treatment for non-contact spectacle lenses or optical filters;
   b. compressing the powders or granules in a mold by the pressure needed to produce a strong, solid tablet which can be molded in various geometrical shapes;
   c. introducing the solid tablet into liquid in a dyebath, thereby obtaining a solution for coloring and otherwise treating plastic non-contact spectacle lenses and optical filters.

2. The method of claim 1 wherein the solid tablet has score marks in order to facilitate division into fractional quantities which may be combined with fractions of other tablets to allow color mixing.

3. The method of claim 1, wherein a coating that eliminates or reduces the oxidation and hydration of the tints and other chemicals in the tablet and improves the tablet's shipping, storage and dissolving properties and will dissolve in heated water is applied to the solid tablet.

4. The method of claim 1, wherein binders are added to the powders or granules to promote tabletization.

5. The method of using tablets or coated tablets to introduce tint, UV absorbers, decolorant, conditioners and other optical chemistry into dyebaths for coloring and otherwise treating plastic non-contact spectacle lenses and optical filters, said method comprising the following steps of:
   a. generating in various geometrical shapes a tablet from solid forms of tint, UV absorbers, decolorant or surfactants designed to produce the desired tinting color, UV absorption or other treatment for non-contact spectacle lenses or optical filters;
   b. introducing the solid tablet into liquid in a dyebath, thereby obtaining a solution for coloring and otherwise treating plastic non-contact spectacle lenses and optical filters.

6. The method of claim 5 wherein the solid tablet has score marks in order to facilitate division into fractional quantities which may be combined with fractions of other tablets to allow color mixing.

7. The method of claim 5 wherein a coating that eliminates or reduces the oxidation and hydration of the tints and other chemicals in the tablet and improves the tablet's shipping, storage and dissolving properties and will dissolve in heated water is applied to the solid tablet.

* * * * *